US006975955B1

(12) United States Patent
Lukindo

(10) Patent No.: US 6,975,955 B1
(45) Date of Patent: Dec. 13, 2005

(54) METHOD AND SYSTEM FOR MANAGING MANUFACTURING TEST STATIONS

(75) Inventor: Anthony Lukindo, Calgary (CA)

(73) Assignee: Ciena Corporation, Linthicum, MD (US)

( * ) Notice: Subject to any disclaimer, the term of this patent is extended or adjusted under 35 U.S.C. 154(b) by 796 days.

(21) Appl. No.: 09/915,971

(22) Filed: Jul. 26, 2001

(51) Int. Cl.[7] .......................................... G06F 19/00
(52) U.S. Cl. ..................................... 702/119; 700/83
(58) Field of Search ............... 702/119, 123, 182–185, 702/120, 84, 108; 700/17, 83, 110, 115; 382/149, 382/218, 282

(56) References Cited

U.S. PATENT DOCUMENTS

| | | | |
|---|---|---|---|
| 5,392,209 A | 2/1995 | Eason et al. ........... 364/413.01 |
| 5,918,191 A | 6/1999 | Patel ........................... 702/84 |
| 5,953,684 A | 9/1999 | Alexander ................... 702/108 |
| 5,963,565 A | 10/1999 | Rezvani et al. ............. 371/22.1 |
| 6,167,401 A | 12/2000 | Csipkes et al. ................ 707/10 |
| 6,202,070 B1 | 3/2001 | Nguyen et al. |
| 6,418,391 B1 * | 7/2002 | Umezu et al. ............... 702/123 |
| 2002/0107653 A1 * | 8/2002 | Kraffert ....................... 702/119 |

* cited by examiner

*Primary Examiner*—Edward Raymond
(74) *Attorney, Agent, or Firm*—Michael R. Cammarata; David A. Fox

(57) ABSTRACT

An exemplary embodiment of the invention is a method of managing test files among a plurality of test stations for testing products. The method includes obtaining a test file having a test file name and assigning a unique identifier to the test file. Enforcement criteria are also assigned to the test file. The test file, test file name, the unique identifier and the enforcement criteria are stored. The test file is then conditionally distributed to at least one of the plurality of test stations according to the enforcement criteria. An alternate embodiment is a system for implementing the method.

30 Claims, 7 Drawing Sheets

METHOD AND SYSTEM FOR MANAGING MANUFACTURING TEST STATIONS

BACKGROUND OF THE INVENTION

1. Field of Invention

The invention relates generally to management of test stations in a manufacturing environment and particularly to managing test files distributed to test stations for testing products.

2. Description of Related Art

Current manufacturing processes often include a test stage where products are inspected and/or tested for proper operation and quality. Often, these test stations employ computers to perform tasks such as executing test programs, interfacing with and configuring test equipment, providing instructions to an operator and storing test results.

Managing computer-readable test files used at each test station can be a daunting task. As new versions of test files (input data, test applications, etc.) are developed, each test station computer needs to be updated to include the latest release of the test files. In addition, each test station should use the same test files so that test results gathered at each test station can be grouped or otherwise more efficiently managed.

The process of managing test files stored at each test station has been performed by support personnel physically visiting each test station to ensure that the proper test files are installed. This is a time-intensive process prone to human error. As the number of test stations increases, the delay in updating the test files for each test station can disrupt the manufacturing process and increase lead times.

SUMMARY OF THE INVENTION

An exemplary embodiment of the invention is a method of managing test files among a plurality of test stations for testing products. The method includes obtaining a test file having a test file name and assigning a unique identifier to the test file. Enforcement criteria are also assigned to the test file. The test file, test file name, the unique identifier and the enforcement criteria are stored. The test file is then distributed to one of the plurality of test stations in response to the enforcement criteria. An alternate embodiment is a system for implementing the method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
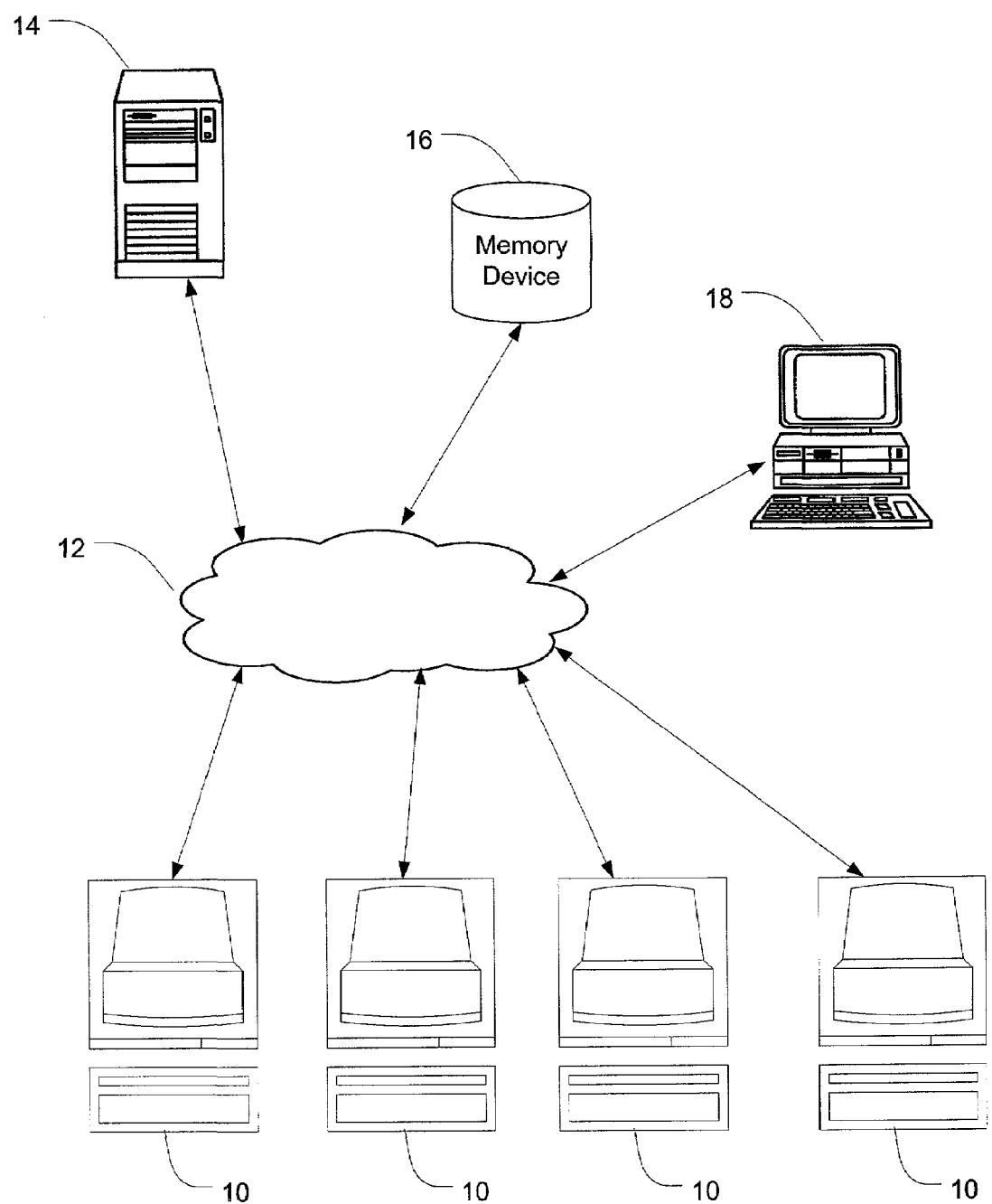
FIG. 1 is a block diagram of a system for manufacturing managing test files in an exemplary embodiment of the invention.
Figure 2:
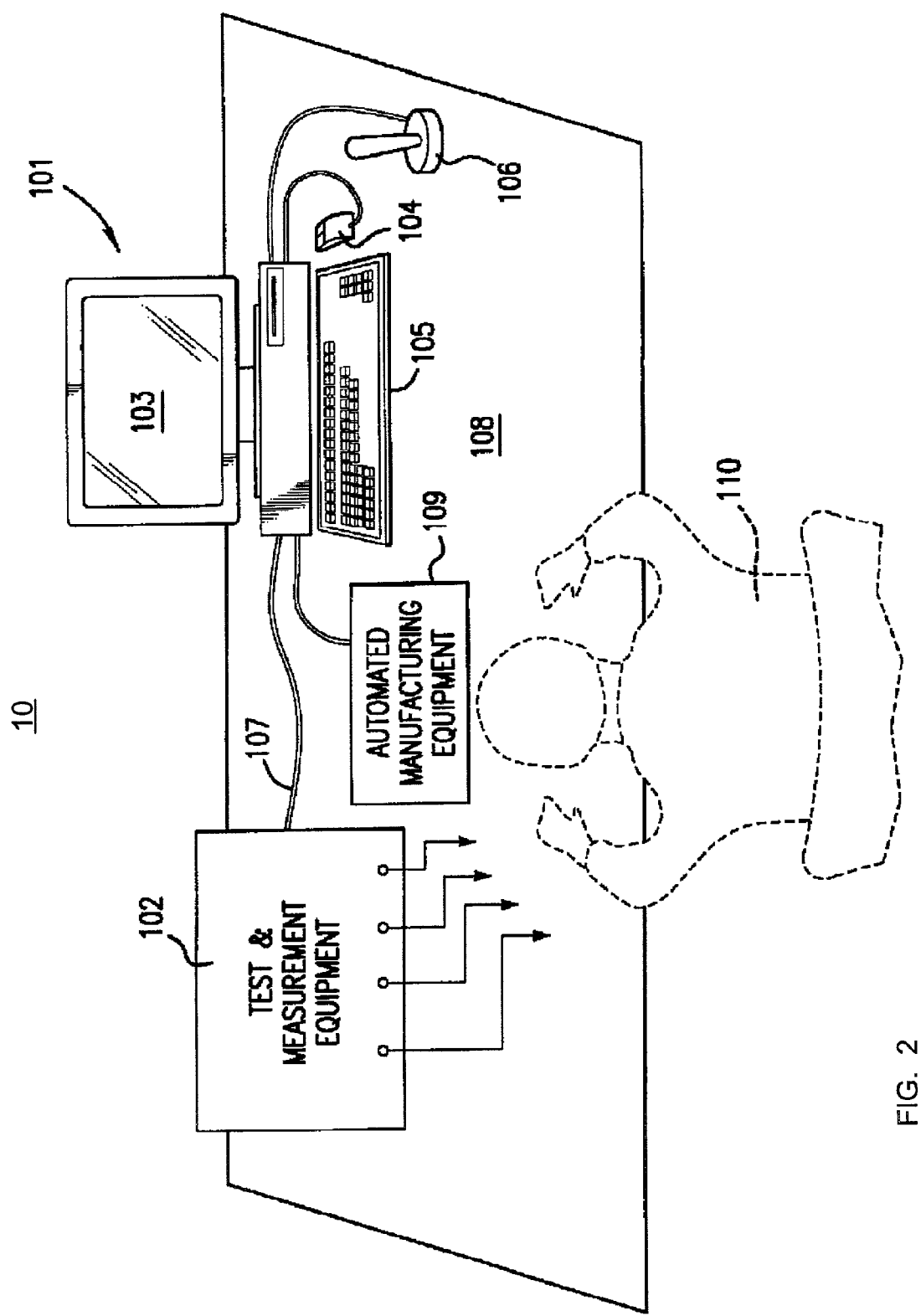
FIG. 2 is a block diagram of a test station in an exemplary embodiment of the invention.

FIG. 1 is a block diagram of an exemplary system for managing manufacturing test stations in an embodiment of the invention. The system includes a plurality of test stations 10 for testing products. The product may be any item, but in a preferred embodiment the product is a component used in an optical communications network. An exemplary test station 10 is described in U.S. Pat. No. 6,147,401, commonly owned by the assignee of this application, the entire contents of which are incorporated herein by reference. FIG. 2 depicts an exemplary test station 10.

As shown in FIG. 2, the test station 10 generally includes a computer 101 and test equipment 102. The computer 101 has a display 103 for display of various graphical user interfaces (GUI's), as well as the usual input devices such as a mouse 104, a keyboard 105 and a bar code reader 106. In addition, cable connectors 107 provide means for interfacing the computer 101 with the test equipment 102. In addition, the test station 10 includes an assembly platform 108, which may include automated manufacturing equipment 109 and/or sensors and actuators for the assembly of component parts by the operator 110. Any automated manufacturing equipment is also under control of the computer 101 via cables 107.

During operation, the computer 101 accesses test files from local memory (e.g., a hard drive). The test files may include a variety of files including executable applications, configuration files for configuring the computer, initialization files for initializing the product and/or initializing test equipment, test input data, etc. The components of the system shown in FIG. 1 operate to ensure that each test station 10 has up-to-date test files so that each test station 10 operates in a similar manner when testing the same product. This provides uniformity in product testing and facilitates grouping results from multiple test stations.

As shown in FIG. 1, test stations 10 are coupled to a network 12 which may be any type of known network such as a LAN, WAN, Internet, extranet, etc. Test stations 10 may be coupled to network 12 in a wireless manner. Test stations 10 access test files through file server 14 coupled to network 12. The file server 14 may be implemented using known servers such as a file transfer protocol (FTP) server. An administrative system 18 is also coupled to network 12 and provides for execution of various administrative functions as described in further detail herein. The administrative system 18 may be implemented using a general purpose computer executing a computer program to perform the functions described herein. A database 16 is also coupled to network 12 and may be implemented using known storage devices using existing database software. Database 16 supports administrative system 18 and may be one or more separate physical devices addressed by administrative system 18. Database 16 contains information concerning each test station 10 and test files as described in further detail herein.

The system includes software components for managing test files. A test station component executed by computer 101 performs tasks such as obtaining updated test files as described in further detail herein. An administrative component is executed by administrative system 18 and provides functions such as updating database 16 and auditing test station test files as described in further detail herein. Database 16 is preferably a relational database that provides test file management logic that controls which files are provided to each test station 10.

Figure 3:
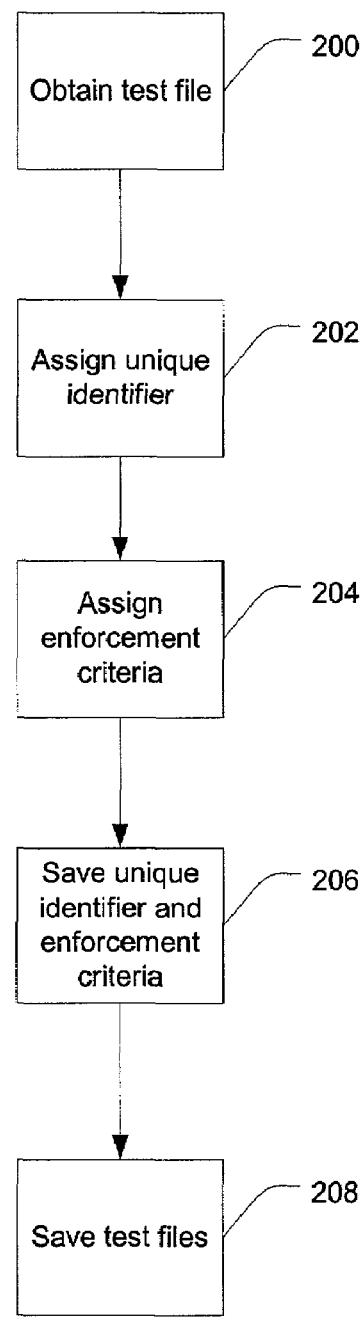
FIG. 3 is a flowchart of a process for storing test files in an exemplary embodiment of the invention.

An exemplary process for creating files on server 14 is depicted in the flowchart of FIG. 3. The process begins at step 200 where a test file is provided to administrative system 18 for addition to file server 14. One source of test files may be a test engineer charged with generating test files as products evolve. As noted above, the test file may be any type of file used by test stations 10 including executable test files, test fixture data files, test specification files, database results template files, support files, Beta testing files, utility files, test planning database files, test equipment configuration files, test equipment initialization files, etc.

Once the test file is provided to administrative system 18, the file is assigned a unique identifier at step 202 through a process referred to as stamping. Stamping allows files having the same name to be differentiated so that the proper file can be identified for operations such as updates, deletes, replacements, etc. The unique identifier may be generated by a routine (e.g., a mathematical operation) that utilizes the file creation date and time and file size in bytes to produce the unique identifier. The routine may be executed at any time on any file to generate the identifier. Updated or Beta test files can be provided to a test station 10 and the test station does not need to be altered to call this updated file. The administrator using administrative system 18 initiates the stamping through a user interface. The test file and unique identifier are then stored on file server 14. Test file information (e.g., file name, unique identifier, etc.) is stored in database 16.

Enforcement criteria are assigned at step 204. As described in further detail herein, files may be enforced based on a number of criteria. A test station 10 will obtain enforced files from server 14 having enforcement criteria matching that test station. In this way, it is ensured that each test station 10 has the proper test files. An operator at administrative system 18 specifies enforcement criteria through a user interface and the enforcement criteria for each test file are stored in database 16.

The enforcement criteria may include one or more test station identifiers specifying that the test file is for use with particular test stations 10. A test station identifier may be associated with each test station 10 and each test file may be limited for use with particular test stations. For example, a test file for use with the Windows™ operating system would be enforced for all test stations operating the Windows™ operating system. Another test file may be enforced for test stations operating an alternate operating system. If a test file lacks a test station identifier in its enforcement criteria, the default is that all test stations utilize the test file.

An additional enforcement criteria is a support file criteria. The support file criteria is used to associate test files with another test file. For example, an executable test file may have a number of data files that the application calls during execution. These data files are designated as files supporting the executable test file. If the executable test file is enforced (e.g., enforced to a particular test station), then these supporting files are also enforced in the same manner. When a test file is updated, the administrative system 18 determines if there are any associated support files through the support file criteria and updates the support files as well.

Another enforcement criteria is a product identifier that identifies the products that the test file is for use with. A test file may be associated with one or more specific products. For example, two different optical filters may be tested for different characteristics and thus have differing test files used during the test process. By using a product identifier as one of the enforcement criteria, the proper test files are utilized with varying products.

As noted above, an operator creates the test file unique identifier and enforcement criteria through administrative system 18. Test file information such as the test file name, unique identifier and enforcement criteria are then saved in database 16 at step 206. The test files are stored on file server 14 as indicated at step 208.

Figure 4:
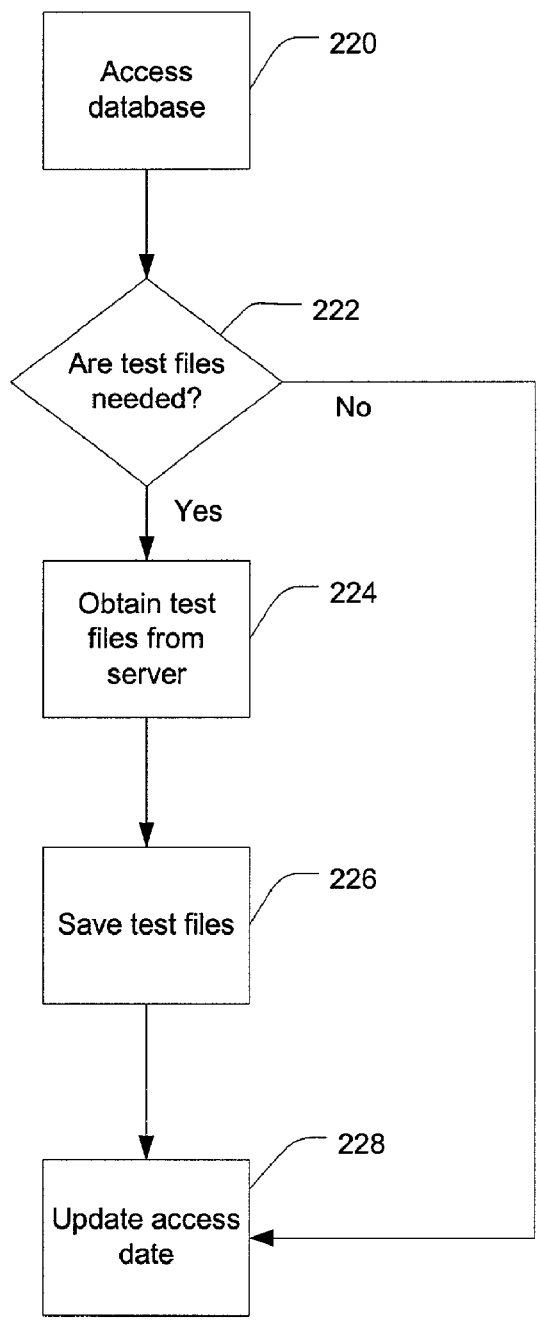
FIG. 4 is a flowchart of a process for updating test files at a test station in an exemplary embodiment of the invention.

During operation, each test station 10 accesses database 16 and determines which test files are needed at the test station 10 based on the enforcement criteria. FIG. 4 depicts an exemplary process implemented by the test station component executed by computer 101 at test station 10. At step 220, the test station 10 accesses database 16 to determine if any new test files are available for test station 10 or if any test files on test station 10 need to be updated. Test station 10 accesses database 16 and locates files having enforcement criteria 20 matching that test station. This may be performed by comparing the test station identifier to the enforcement criteria test station identifier and/or by comparing a test station product identifier to the enforcement criteria product identifier.

Step 220 may be initiated in multiple ways. Test station 10 may be programmed to periodically (e.g., once a day) access the database 16 and determine if test files need to be retrieved. Alternatively, the test station 10 may access database 16 immediately prior to executing a test program. For example, when an operator logs into a test station 10 and indicates that testing for a product will occur, computer 101 may access database 16 to ensure that the most recent test files are utilized. In addition, administrative system 18 may send an update message to each test station 10 to update test files when new test files are stored on server 14. Each test station 10 then accesses database 16 to determine if new or updated test files are needed.

At step 222, test station 10 determines whether test files are needed. Through the unique identifier associated with each test file, the test station 10 can compare local files to those identified in database 16 to determine if new or updated test files are needed. If no test files are needed, flow proceeds to step 228 where an access date stored in database 16 is updated to reflect when each test station 10 accessed database 16. In this way, administrative system 18 may identify test stations 10 that have not updated test files within a time period (e.g., one month). These test stations can then be flagged for inspection to determine why updates have not occurred.

If at step 222, it is determined that test files are needed, flow proceeds to step 224 where the relevant test files are distributed from file server 14. As noted above, each test file includes a unique identifier so that locating the proper test file is facilitated. The test file retrieved from server 14 is stored in computer 101 of test station 10 at step 226 replacing existing test files and/or adding new test files. Upon obtaining the test files, flow proceeds to step 228 where the access date for the test station in database 16 is updated.

Through the process depicted in FIG. 4, a test station 10 can easily obtain files to test different products. As noted above, the process may be initiated when an operator logs into a test station 10 and specifies a product to be tested. The test station 10 then determines whether the test files needed to test the product are available and, if not, the test station obtains the test files from server 14.

Figure 5:
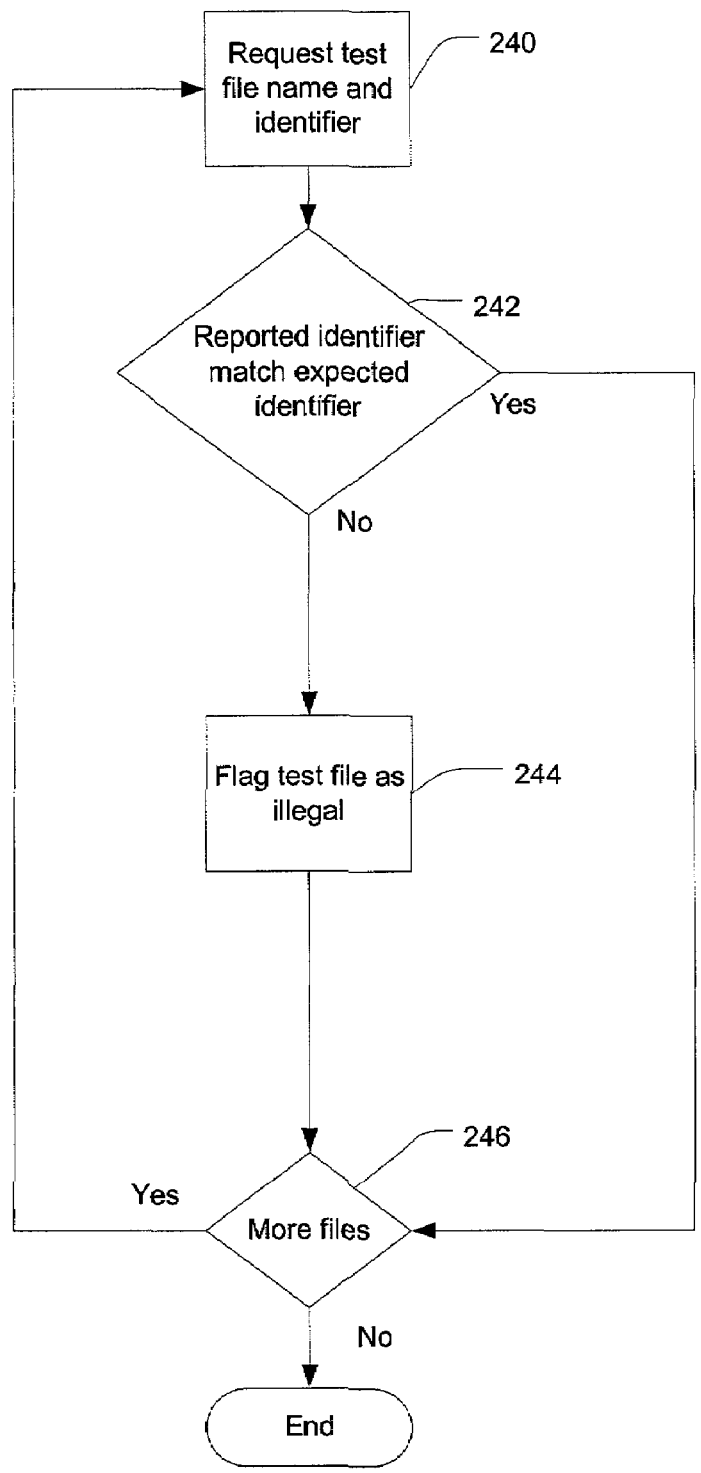
FIG. 5 is a flowchart of a process for auditing test files in an exemplary embodiment of the invention.

The administrative system 18 and database 16 also enable an operator at administrative system 18 to perform a test file audit. An exemplary file audit procedure is shown in FIG. 5. At step 240, the administrative system 18 obtains a list of file names and file identifiers from a test station 10 under audit. At step 242, the reported identifier is compared to an expected identifier (i.e., the unique file identifier generated when the test file was added to database 16). If the reported identifier and expected identifier match, then the test file is considered good and flow proceeds to step 246. At step 246, it is determined whether more test files remain to be audited. If so, the process loops to step 240 where the next file is accessed. If not, the process terminates.

If at step 242, the reported identifier and the expected identifier do not match, then the test file is flagged as illegal at step 244. An illegal file may be present if a prior version of a test file was not updated. For example, if a file was updated on server 14 but not on test station 10, then the reported file identifier would not match the expected file identifier. A listing of all files on the test station may be presented to the administrative system 18 along with an indication of whether the file identifiers matched or not. Corrective measures (e.g., providing the updated file to the test station and deleting the illegal file) may then be taken for illegal files.

Another feature of the system for managing manufacturing test stations is the ability to track and update test station configurations. Test stations 10 may be configured to test certain types of products and thus not all test files will be suitable for all test stations. For example, a test station lacking an optical spectrum analyzer (OSA) could not execute test programs requiring an OSA. The test station management system distributes test files in accordance with test station configurations.

Figure 6:
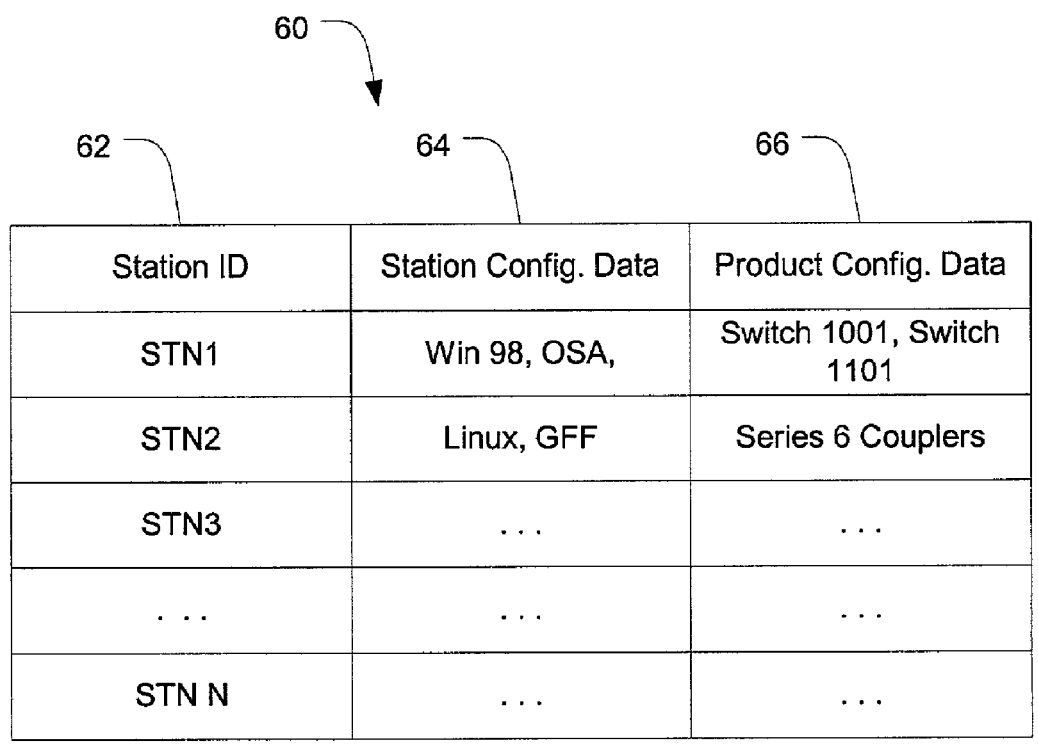
FIG. 6 depicts an exemplary test station configuration file.

Database 16 tracks test station configuration data and controls whether test files are suitable for certain test stations. Database 16 includes a test station configuration file 60 depicted in FIG. 6 that maintains data related to the configuration of each test station 10. The test station configuration file 60 includes a first station identifier field 62 that identifies each station 10 coupled to network 12. A test station configuration field 64 includes test station configuration data identifying operational aspects of each test station 10. Software and hardware components may be identified in the test station configuration field 64. A test station product configuration field 66 identifies which products may be tested at each test station 10. In the example shown in FIG. 6, test station number 1 is equipped with an OSA and may test switches having model numbers 1001 and 1101. Test station number 2 includes a gain flattening filter and may test series 6 couplers. As test stations 10 are reconfigured (either software or hardware altered) and/or new products developed, the test station configuration file 60 is updated.

The test station configuration file 60 may be automatically updated. In one embodiment, the administrative system periodically (e.g., daily) accesses each test station 10 and determines the configuration of the test station 10. The test station configuration may be detected by the administrative system 18 executing a hardware/software detection application. Existing operating systems provide the ability to detect installed hardware and/or software components. Alternatively, the test station 10 may detect installed hardware and/or software components and provide a report to the administrative system 18. In either case, the test station configuration file 60 is updated.

In an alternate embodiment, the test station configuration file is updated whenever a change occurs at a test station 10. For example, if support personnel installs a new piece of test equipment, part of the routine for adding new hardware includes sending a message to the administrative system 18 to update the test station configuration file 60. Similarly, when hardware is removed or "uninstalled" from a test station 10, a message may be sent to the administrative system 18 to update the test station configuration file 60.

Figure 7:
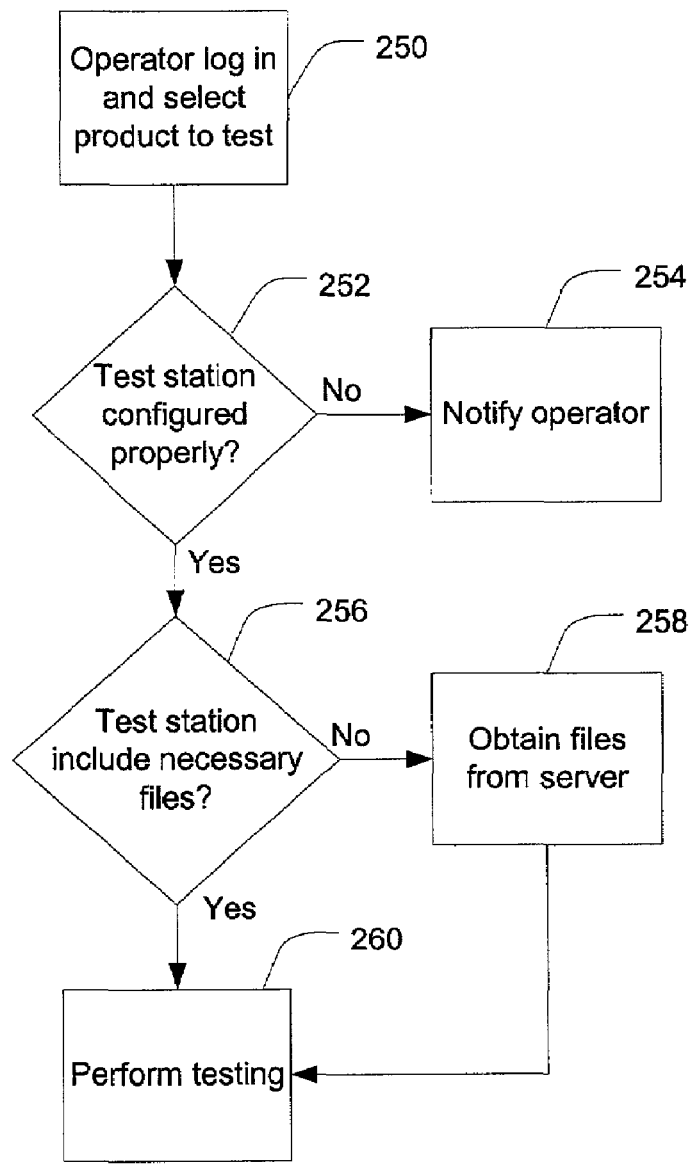
FIG. 7 is a flowchart of a process for managing test files in an exemplary embodiment of the invention.

The test station configuration file 60 may be used as an enforcement criteria in multiple processes. One such use is to authorize initiation of a test routine at a test station 10 as depicted in the flow chart of FIG. 7. In operation, an operator at a test station 10 logs in and selects a product for testing as shown at step 250. The operator may be identify himself through a user identifier and password and select a product for test through a user interface. The test station identifier and product for test are compared against the test station configuration file 60 at step 252. If the test station 10 is not configured to test the specified product, then the operator is notified at step 254 and the process ends. If the test station 10 is configured properly, flow proceeds to step 256 where it is determined whether the test station 10 includes the appropriate test files. This may be done by comparing files at the test station 10 with requisite files identified by the product identifier enforcement criteria described above. If the required files are not available, flow proceeds to step 258 where the required files are transferred from server 14 to test station 10. Once the required files are provided to the test station 10, the testing occurs at step 260.

The test station configuration file 60 serves as an enforcement criteria that confirms enforcement of files by an administrator described above. An administrator has the ability to assign enforcement criteria to files for a particular test station 10. The test station configuration file 60 may be used as another enforcement criteria to confirm that the enforcement is proper. For example, test files for initializing an OSA should not be enforced on a test station lacking an OSA. Administrative system 18 may access the test station configuration file 60 to confirm enforcement of a test file to a test station.

As described above, the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of managing manufacturing test files among a plurality of test stations for testing products, wherein at least one of the test stations, products, support files supporting the test file, or test station configurations is different from another respective one of the test stations, products, support files supporting the test file, or test station configurations, the method comprising:
   obtaining a test file having a test file name;
   assigning a unique identifier to the test file;
   associating file transfer enforcement criteria with the test file;
   storing the test file, test file name, the unique identifier and the file transfer enforcement criteria; and
   permitting/blocking distribution of the test file to the test stations according to the file transfer enforcement criteria to ensure compatibility.

2. The method of claim 1 wherein the file transfer enforcement criteria includes a test station identifier criterion.

3. The method of claim 2 further comprising comparing a test station identifier associated with the test station to the test station identifier criterion, said distributing being permitted when the test station identifier matches the test station identifier criterion.

4. The method of claim 1 wherein the file transfer enforcement criteria includes a product identifier criterion.

5. The method of claim 4 further comprising comparing a product identifier associated with the test station to the product identifier criterion, said distributing being permitted when the product identifier matches the product identifier criterion.

6. The method of claim 1 wherein the file transfer enforcement criteria includes a support file criterion.

7. The method of claim 6 further comprising locating support test files associated with the test file in response to the support file criterion and distributing the support test files to the test station.

8. The method of claim 1 wherein the file transfer enforcement criteria includes a test station configuration file defining a configuration of the test station.

9. The method of claim 8 wherein said permitting/blocking distribution includes:
   accessing the test station configuration file;
   determining from the test file configuration file if the test station is configured to test a product; and
   providing the test file to the test station if the test station is configured to test the product.

10. The method of claim 9 wherein the test station configuration file includes hardware components associated with the test station, the hardware components associated with the test station including test equipment.

11. The method of claim 1 wherein said permitting/blocking distribution of the test file occurs periodically at a predetermined interval.

12. The method of claim 1 wherein said permitting/blocking distribution of the test file occurs upon an operator accessing the test station.

13. The method of claim 1 wherein said permitting/blocking distribution of the test file occurs upon said storing.

14. The method of claim 1 further comprising performing an audit of the test station, said performing an audit including:
   obtaining a reported file identifier from the test station;
   comparing the reported file identifier to the unique identifier;
   classifying the test file as illegal if the reported file identifier and the unique identifier do not match; and
   deleting illegal files from the test station.

15. The method of claim 1 wherein the product is an optical communications network component.

16. A system for managing manufacturing test files among a plurality of test stations for testing products, wherein at least one of the test stations, products, support files supporting the test file, or test station configurations is different from another respective one of the test stations, products, support files supporting the test file, or test station configurations, the system comprising:
   a plurality of test stations;
   a network coupled to said test stations;
   an administrative system coupled to said network;
   a database coupled to said network; and
   a file server coupled to said network, said file server storing a test file, the test file having a unique identifier and file transfer enforcement criteria associated therewith;
   said test stations conditionally receiving the test file according to the file transfer enforcement criteria to ensure compatibility.

17. The system of claim 16 wherein the file transfer enforcement criteria includes an test station identifier criterion.

18. The system of claim 17 wherein said test station conditionally receives the test file from said file server when a test station identifier associated with said test station matches the test station identifier criterion.

19. The system of claim 16 wherein the file transfer enforcement criteria includes an product identifier criterion.

20. The system of claim 19 wherein said test station conditionally receives the test file from said file server when a product identifier associated with said test station matches the product identifier criterion.

21. The system of claim 16 wherein the file transfer enforcement criteria includes a support file criterion.

22. The system of claim 21 wherein said test station conditionally receives support test files from said file server in response to the support file criterion.

23. The system of claim 16 wherein the file transfer enforcement criteria includes a test station configuration file defining a configuration of said test station.

24. The system of claim 23 wherein said administrative system:
   accesses the test station configuration file;
   determines from the test file configuration file if said test station is configured to test a product; and
   provides the test file to said test station if the test station is configured to test the product.

25. The system of claim 24 wherein the test station configuration file includes hardware components associated with said test station, said hardware components associated with said test station including test equipment.

26. The system of claim 16 wherein said test station periodically, conditionally receives test files at a predetermined interval.

27. The system of claim 16 wherein said test station conditionally receives test files upon an operator accessing said test station.

28. The system of claim 16 wherein said test station conditionally receives test files upon storing of the test file in said database.

29. The system of claim 16 wherein said administrative system performs an audit of said test station, the audit including:

obtaining a reported file identifier from said test station;

comparing the reported file identifier to the unique identifier;

classifying the test file as illegal if the reported file identifier and the unique identifier do not match; and initiating deletion of illegal files from said test station.

30. The system of claim 16 wherein the product is an optical communications network component.

* * * * *